United States Patent
Healy

(10) Patent No.: US 6,327,548 B1
(45) Date of Patent: Dec. 4, 2001

(54) METHOD OF ADJUSTING WHEEL ALIGNMENT ANGLES

(75) Inventor: Donald A. Healy, Conway, AR (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/479,902

(22) Filed: Jan. 10, 2000

(51) Int. Cl.[7] ................................................. G01B 11/275
(52) U.S. Cl. ........................ 702/151; 33/288; 356/139.09
(58) Field of Search ........................ 33/288, 203, 203.18; 356/138, 139.04, 155, 139.09; 702/150, 151, 152, 153, 154

(56) References Cited

U.S. PATENT DOCUMENTS

| | | |
|---|---|---|
| 4,241,931 | 12/1980 | Healy . |
| 4,285,136 | 8/1981 | Ragan . |
| 4,815,216 | 3/1989 | Swayne . |
| 5,242,202 | 9/1993 | Ettinger . |
| 5,313,711 * | 5/1994 | Kling, III et al. ...................... 33/288 |
| 5,335,420 * | 8/1994 | Kling, III et al. ...................... 33/288 |
| 5,513,439 * | 5/1996 | Brauer et al. ...................... 33/203.18 |
| 5,532,816 * | 7/1996 | Spann et al. ...................... 356/139.09 |
| 5,535,522 | 7/1996 | Jackson . |
| 5,583,797 * | 12/1996 | Fluegge et al. ...................... 364/552 |
| 5,598,357 * | 1/1997 | Colarelli, III et al. ............... 364/559 |
| 5,602,733 * | 2/1997 | Rogers et al. ................. 364/424.034 |
| 5,625,953 | 5/1997 | Healy et al. . |
| 5,724,743 * | 3/1998 | Jackson .................................. 33/288 |
| 5,748,301 * | 5/1998 | Muller et al. ........................ 356/155 |
| 5,760,938 * | 7/1998 | Hodge ............................. 359/139.09 |
| 5,781,286 * | 7/1998 | Knestel ............................ 356/139.09 |
| 5,870,315 * | 2/1999 | January ............................ 364/528.14 |
| 5,875,418 | 2/1999 | Gill et al. . |
| 5,948,024 * | 9/1999 | O'Mahony et al. .................... 701/29 |
| 6,134,487 * | 10/2000 | Healy ..................................... 701/29 |
| 6,154,970 * | 12/2000 | Reichelt et al. ................... 33/203.18 |
| 6,178,358 * | 1/2001 | Colarelli et al. ....................... 700/16 |

* cited by examiner

*Primary Examiner*—Patrick Assouad
(74) *Attorney, Agent, or Firm*—McDermott, Will & Emery

(57) ABSTRACT

A computer-assisted method for adjusting alignment angles of a wheel attached to a wheel mounting structure of a vehicle. This method includes measuring a baseline wheel alignment angle with respect to a rim or hub of a wheel and using a computer for storing baseline wheel alignment angle data in a memory. A required change in the wheel alignment angle is determined from the baseline wheel alignment angle. Then, the wheel and rim are removed from the mounting structure and, using the computer, the baseline wheel alignment angle data is retrieved from the memory. Finally, a change in wheel alignment angle from the baseline wheel alignment angle is measured while adjusting the mounting structure. The change in wheel alignment angle data and the required change in the wheel alignment angle are compared.

20 Claims, 5 Drawing Sheets

METHOD OF ADJUSTING WHEEL ALIGNMENT ANGLES

FIELD OF THE INVENTION

The present invention relates to wheel alignment methods and devices and, more specifically, to a computer-assisted method for adjusting wheel alignment angles that allows easy access to wheel alignment adjustment points.

BACKGROUND OF THE INVENTION

Vehicle wheel aligners are well known in the art. Such aligners typically comprise a computer or processor operated in conjunction with a number of alignment heads, mountable relative to the wheels of a vehicle, and angle measuring instruments to measure the alignment characteristics of the vehicle. Examples of such vehicle wheel aligners can be found in U.S. Pat. Nos. 5,724,743 and 5,875,418, both of which are owned by the assignee hereof. The alignment heads of these vehicle wheel aligners are typically mounted to the rims of the wheels using wheel clamps. Examples of such wheel clamps can be found in U.S. Pat. Nos. 5,242,202 issued to Ettinger; 4,815,216 issued to Swayne; and 4,285,136 issued to Ragan, all of which are owned by the assignee hereof.

These conventional vehicle wheel aligners are capable of indicating the adjustments that must be performed to correct wheel misalignment. For example, the vehicle wheel aligner might indicate that the camber, an angular measure representing the inward or outward tilt of the wheel from a true vertical, is 1° and should be adjusted ½° to a final value of ½°. Likewise, the vehicle wheel aligner might indicate that the caster, an angular measure determined by the relationship of the upper ball joint to the lower ball joint or the upper pivot to the lower pivot in a forward and aft axis, which represents the forward or rearward tilt of the steering axis from a true vertical, is 2° and should be adjusted 1° to a final value of 1°.

However, access to the wheel alignment adjustment points to correct for the indicated deviations is often limited or restricted and it has therefore sometimes been necessary to remove the wheels and the alignment equipment, such as the alignment heads, to provide access to the wheel alignment adjustment points. This is evident, for example, in FIG. 1, which shows a cut-away view of a wheel (not numbered) mounted on a first configuration of vehicle suspension system components including a steering knuckle 10 of a spindle 20 movably attached to upper ball joint 12 and lower ball joint 14, joining the spindle to the upper control arm 16 and the lower control arm 18, respectively, as well as an upper control arm attachment 24. FIG. 2 shows a top view of a another configuration of vehicle suspension system components exposing the general relationship between a wheel 28 attached to a wheel mounting structure of a vehicle, an upper control arm 26, vehicle suspension adjustment points 30, and the vehicle frame 40. Vehicle suspension adjustment points 30 can be adjusted, such as by shimpacks (not numbered) installed at the adjustment points 30 to displace the upper control arm laterally from the vehicle frame 40. FIG. 3a is a top view of a third configuration of vehicle suspension system components including an asymmetric control arm 50 attached to a spindle 52 and a wheel 54. FIG. 3a illustrates, for this asymmetric control arm 50, an adjustment point 60, for adjusting caster, and an adjustment point 70, for adjusting camber. FIG. 3b shows an isometric view of the asymmetric upper control arm of FIG. 3a, showing the same vehicle suspension adjustment points 60, 70 of FIG. 3a. Thus, as shown by these examples, in many vehicle configurations the presence of the wheel impedes or prevents access to these, and other, adjustment points.

One conventional approach to access the vehicle suspension adjustment points involves removing the wheel alignment equipment and wheel following an initial reading, approximating the degree of the adjustment needed, executing the corresponding adjustments, reassembling of the wheel and measurement device, and remeasuring the alignment to determine if the adjustments are acceptable. However, this method is inexact and sometimes requires multiple iterations, involving considerable time.

In another conventional approach, alignment technicians remove the electronic measuring device and the wheel and substitute mechanical measuring devices, such as a level vial, to the hub to provide a visual indication of the degree of change. However, mechanical measuring devices are not as accurate as the electronic measuring device and, in the case of the level vial, the mechanical device is not suited for adjustments to caster.

In yet another conventional approach, alignment technicians simply leave the vehicle wheel alignment equipment in place and rely upon specialized tools, such as wrenches with particularized shapes and special pry bars, to compensate for the inaccessibility of the adjustment points. However, this approach requires a large inventory of specialized tools.

A need exists for an improved method of adjusting wheel alignment angles that provides enhanced access to wheel alignment adjustment points.

SUMMARY OF THE INVENTION

In accordance with the foregoing object, the present invention advantageously provides, in one preferred embodiment, a computer-assisted method for adjusting wheel alignment angles of a wheel attached to a wheel mounting structure of a vehicle. This method includes the steps of measuring a baseline wheel alignment angle with respect to a rim or hub of a wheel and using a computer for storing baseline wheel alignment angle data in a memory; determining from the baseline wheel alignment angle a required change in the wheel alignment angle; and removing the wheel and rim from the mounting structure. Further steps include using the computer to retrieve the baseline wheel alignment angle data from the memory; measuring a change in wheel alignment angle from the baseline wheel alignment angle while adjusting the mounting structure; and comparing the change in wheel alignment angle data and the required change in the wheel alignment angle. In this manner, removal of the wheel and rim from the mounting structure enables easy access to the alignment points, while simultaneously enabling the use of an electronic wheel alignment measuring device.

Another embodiment of the computer-assisted method for adjusting alignment angles of a wheel mounted to a wheel mounting structure of a vehicle includes the steps of receiving, by a computer, baseline measurements of a wheel alignment angle from a measurement device attached to a rim or hub of the vehicle and storing the baseline wheel alignment angle data in a memory; determining a required change a wheel alignment angle; prompting for removal, by a technician, of the rim and wheel from the mounting structure of the vehicle and for attaching a measurement device to the mounting structure; and prompting for adjustment, by the technician, of the wheel alignment angle in a direction of the required change. Further steps include receiving measurements of the change in wheel alignment angle measured by the measurement device attached to the mounting structure; and prompting the technician to stop adjusting the wheel alignment angle when the measured change in wheel alignment angle substantially corresponds to the required change.

In yet another embodiment, a computer-assisted wheel alignment system for adjusting alignment angles of a wheel attached to a wheel mounting structure of a vehicle, includes a processor; a memory storing reference wheel alignment data; a measuring device configured to be attached alternatively to (1) a rim or hub of a wheel to produce baseline wheel alignment angle data and (2) the wheel mounting structure to produce a change in wheel alignment angle data; and a data transmission path for carrying data between the measuring device and the processor, wherein the processor is programmed to produce output signal indicating a degree of difference between the baseline wheel alignment angle data and a change in wheel alignment angle data measured by the measurement device.

Additional advantages and other features of the invention will be set forth in part in the description which follows and in part will become apparent to those having ordinary skill in the art upon examination of the following or may be learned from the practice of the invention. The advantages of the invention may be realized and obtained as particularly pointed out in the appended claims.

BRIEF DESCRIPTION OF THE DRAWINGS

FIG. 3b is an isometric view of the asymmetric upper control arm of FIG. 3a, showing the vehicle suspension adjustment points of FIG. 3a.

DETAILED DESCRIPTION OF THE PREFERRED EMBODIMENT OF THE INVENTION

In accordance with one preferred embodiment of the wheel alignment method of the present invention, a wheel alignment technician uses a measurement device attached to a rim or hub of the vehicle to obtain baseline measurements of one or more wheel alignment angles, such as caster and camber. These baseline measurements are sent to a computer, stored in a memory, and used, either by the computer or the technician, to determine a required change in wheel alignment angle from the baseline wheel alignment angle measurements. Either before or after this required change is known, the technician removes the wheel and rim from the wheel mounting structure and attaches a measurement device to the wheel mounting structure. As the technician adjusts the wheel mounting structure, the measurement device measures a change in wheel alignment angle and provides this to the computer, which compares the change in wheel alignment angle to the required change. When this has been accomplished, the adjustment is complete and the technician may then remove the measurement device, reattach the wheel and rim, and compensate for run out. Thus, this embodiment, and other embodiments, of the present invention provide enhanced access to wheel alignment adjustment points and advantageously utilizes a computer and one or more measurement devices to ensure accuracy and efficacy.

Figure 1:
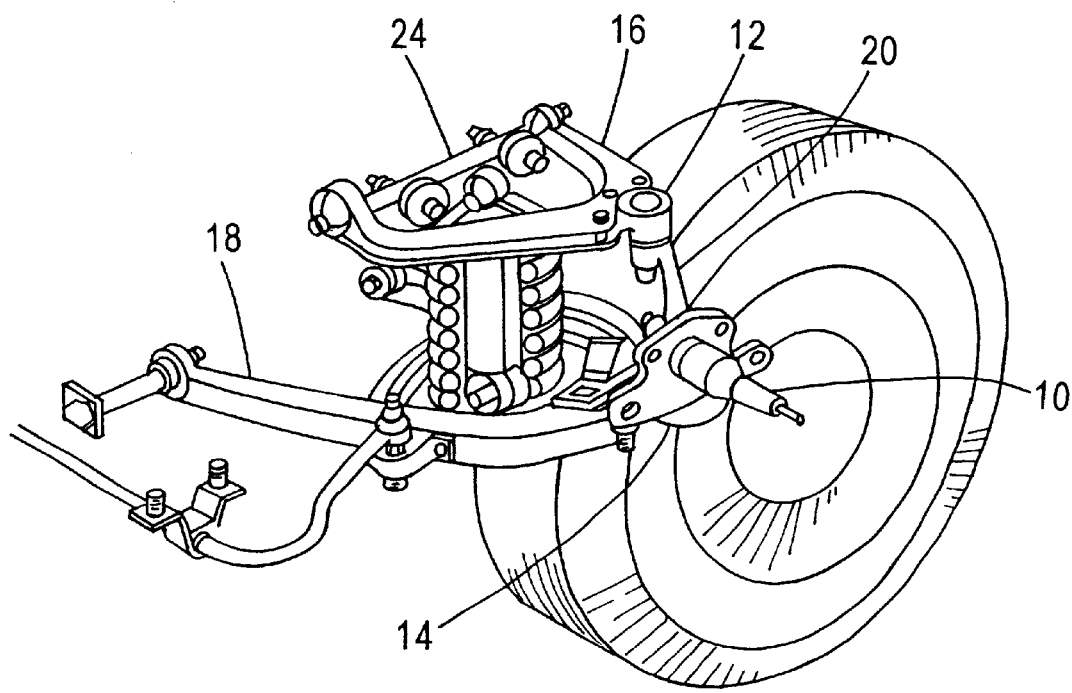
FIG. 1 is a schematic representation of one configuration of vehicle suspension system components relative to a cut-away view of a wheel attached to a wheel mounting structure of a vehicle.
Figure 2:
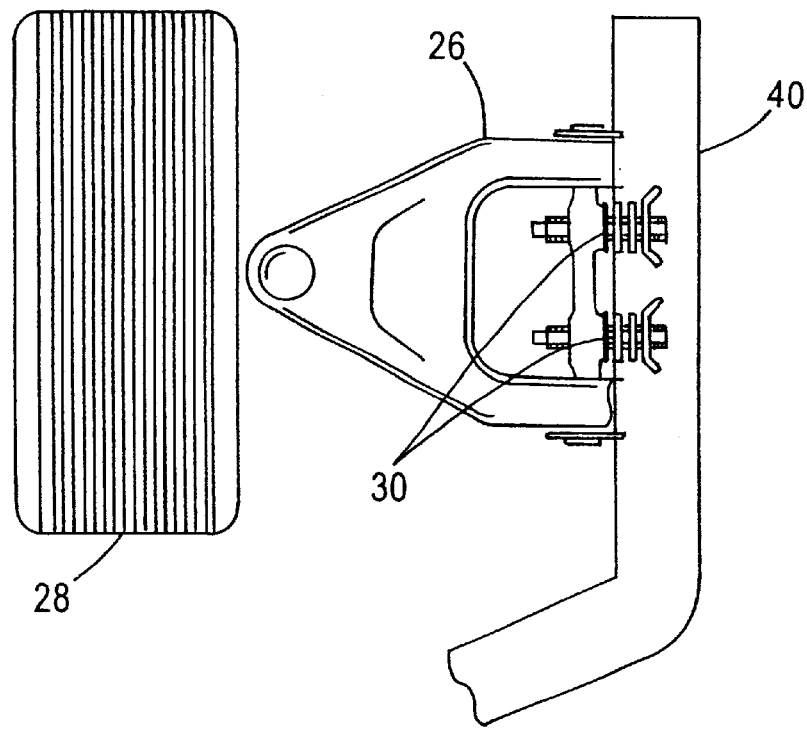
FIG. 2 is a top view of another configuration of vehicle suspension system components relative to a wheel attached to a wheel mounting structure of a vehicle, generally showing a relationship between a wheel, an upper control arm, vehicle suspension adjustment points, and the vehicle frame.
Figure 3A:
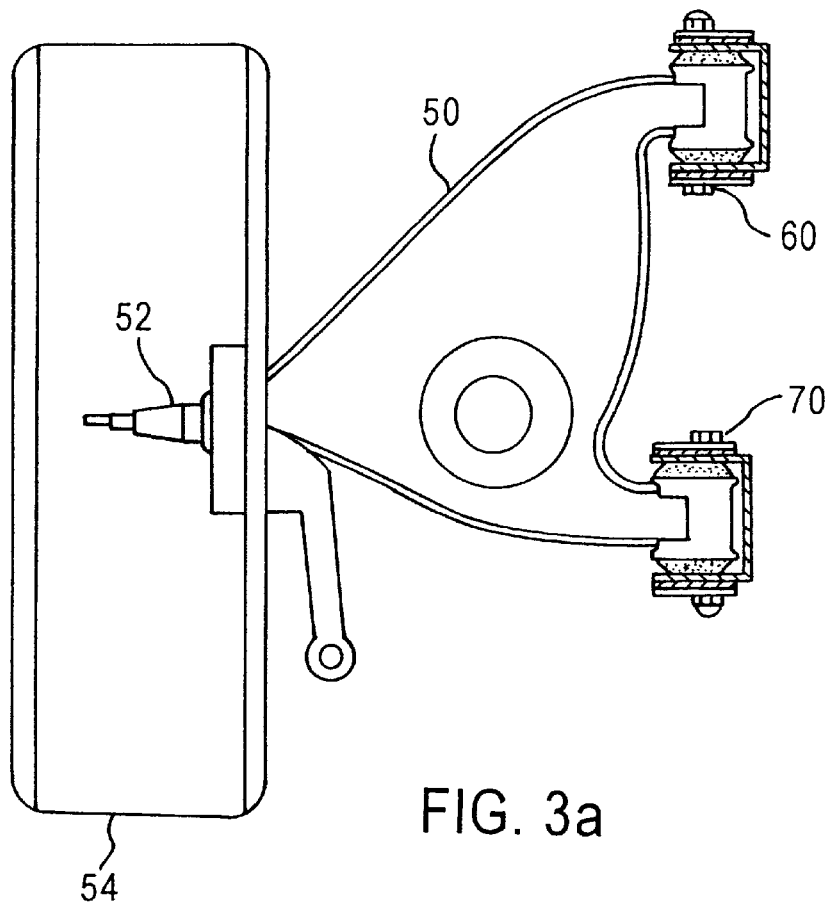
FIG. 3a is a top view of a third configuration of vehicle suspension system components relative to a wheel attached to a wheel mounting structure of a vehicle, showing a relationship between a wheel, an asymmetric upper control arm, and vehicle suspension adjustment points.
Figure 3B:
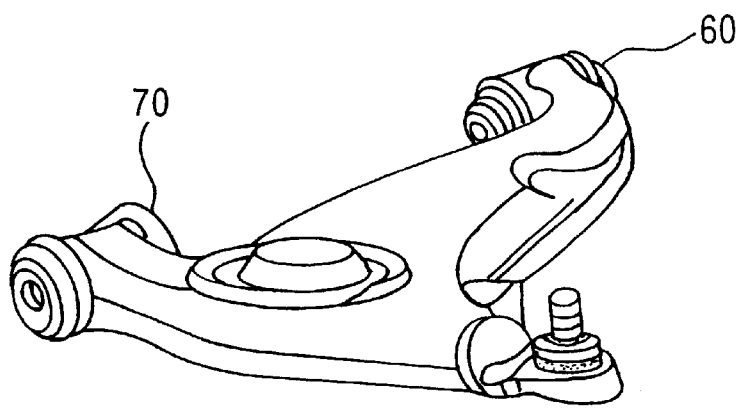
Figure 4:
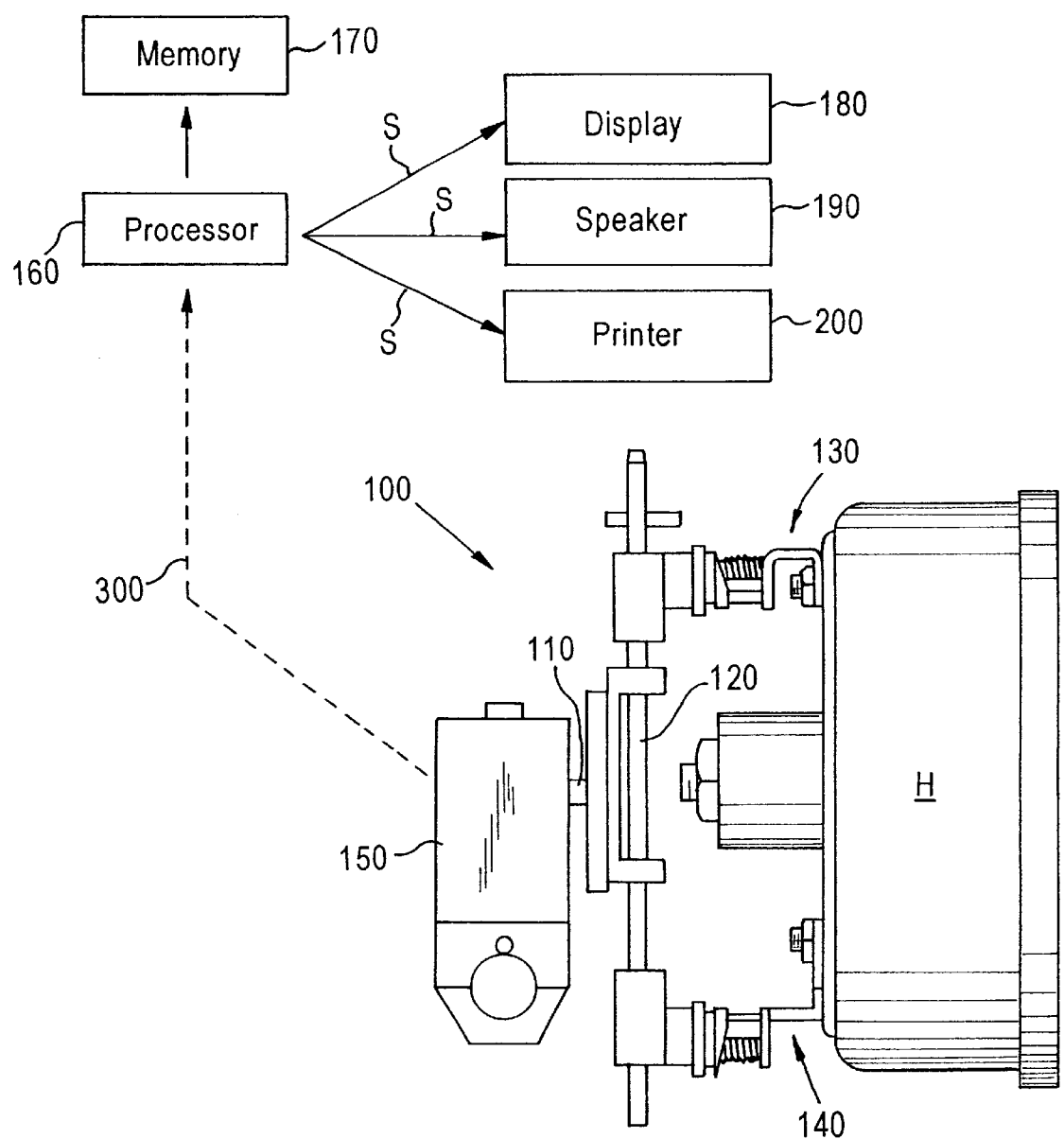
FIG. 4 is a schematic representation of a system embodying the method of the present invention, showing a measurement device attached to a mounting structure, in accordance with a step of a preferred embodiment of the present invention.

FIG. 4 shows, schematically, a wheel alignment system for adjusting wheel alignment angles embodying the method of the present invention. This system includes a measuring device 100, having an alignment head 150 and configured to measure wheel alignment angle and transmit the wheel alignment angle data 300 to a processor, or computer, 160 along a data transmission path for carrying data between the measuring device 100 and the processor 160. Processor 160 is operatively associated with a memory storing device 170, which could include any conventional data storage and retrieval device, such as magnetic disks or tapes or optical discs. Processor 160 receives baseline wheel alignment data from the measuring device 100 attached alternatively to a rim (not shown) or hub H of a wheel and the wheel mounting structure, which includes any mounting structure upon which the measurement device may be attached to measure the wheel mounting structure alignment angles, such as a drum, a spindle, a bolt that holds the wheel bearings, or a brake rotor, but is not limited to these particular components.

In a preferred embodiment, an alignment head 150 shown in FIG. 4 is used in combination with a clamping device (not numbered) mounted to a hub H of a vehicle. This particular clamping device is disclosed in U.S. Pat. No. 5,625,953 (Healy, et al.) and includes bolt-engaging grabbers 130, 140, which engage the bolts of hub H to attach the clamping device to hub H. Frame member 120 supports a head carrier member (not numbered) having a transverse shaft 110 upon which the alignment head 22 is rotatably supported. Thus, the measurement device 100 provides access to wheel alignment adjustment points (not shown) disposed behind the wheel and rim (removed in FIG. 4), produces change in wheel alignment angle data corresponding to an adjustment of a wheel alignment adjustment point, and transmits the wheel alignment angle data to the processor 160 along a data transmission path 300, which could include a wire, infrared or other optical transmission, or radio frequency transmission, but is not limited thereby. Processor 160 is programmed to produce an output signal S indicating a degree of difference between the baseline wheel alignment angle data and a change in wheel alignment angle data measured by the measurement device and transmit that output signal S to one or more output devices 180, 190, 200. These output devices preferably include a video display, such as a CRT, a speaker, or a printer, but could include any medium or mode of transmission of data sufficient to provide the output signal S in a usable form.

In the preferred embodiment, upon completion of the necessary adjustments, the processor prompts the technician to remove the measurement device, reinstall the wheel, reinstall the measurement device to, for example, the rim or hub, and perform run out compensation or wheel positioning, as known and practiced by those skilled in the art.

Figure 5:
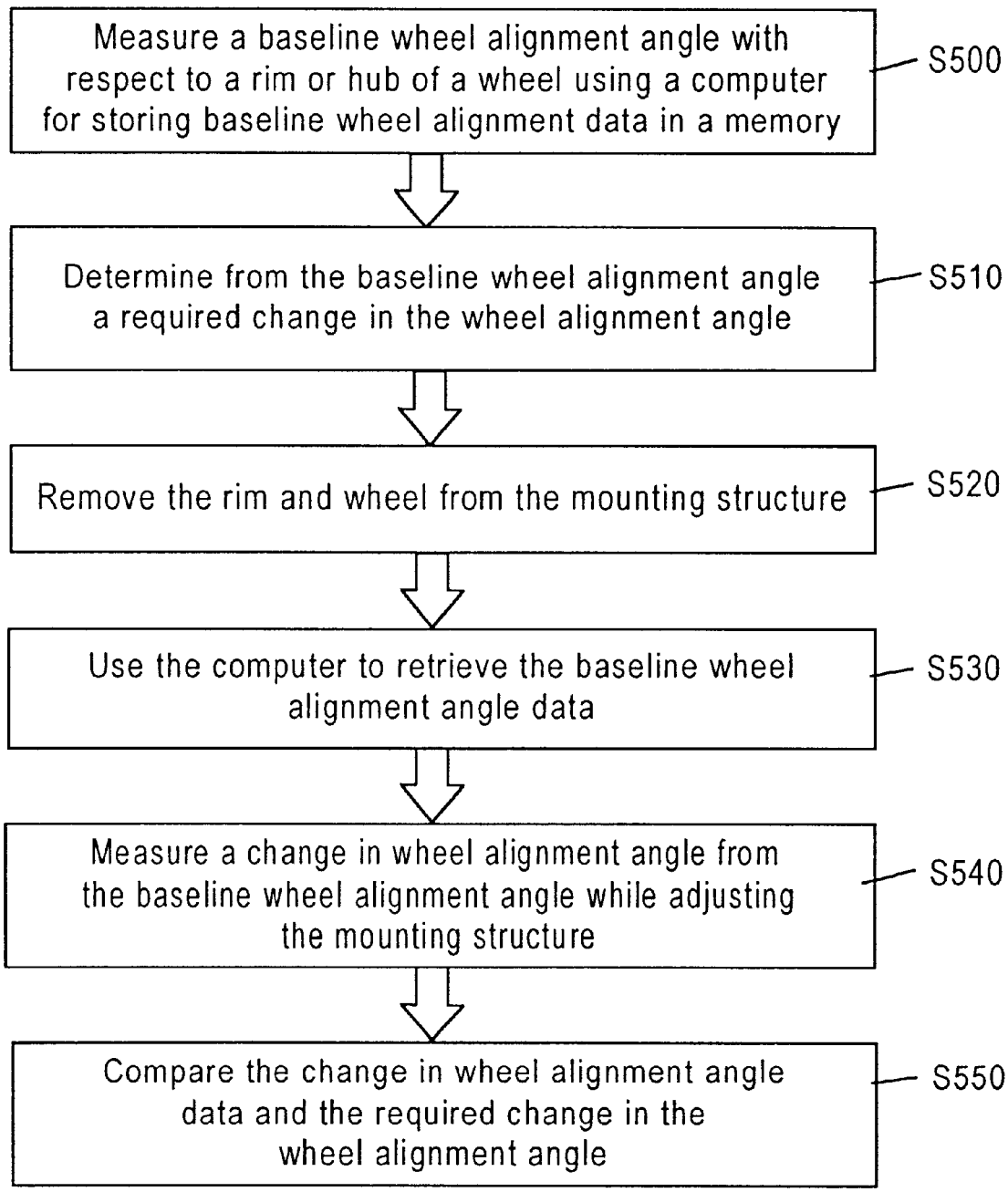
FIG. 5 is a flowchart showing the various steps of a first preferred embodiment of the present invention.

FIG. 5 shows a flowchart of preferred embodiment of a computer-assisted method for adjusting alignment angles of a wheel attached to a wheel mounting structure of a vehicle. In STEP 500, a baseline wheel alignment angle, such as camber, with respect to a rim or hub of a wheel is measured and, using a computer, baseline wheel alignment angle data is stored in a memory. From the baseline wheel alignment angle a required change in the wheel alignment angle is determined (STEP 510). For example, if the measurement device measures the camber as 1° and the camber is to be adjusted to a final value of ½°, the required change is −½°. Likewise, if the measurement device measures the caster as 2° and the caster is to be adjusted to 1°, the required change is −1°.

Next, in STEP 520, the technician removes the wheel and rim from the mounting structure, exposing the adjustment points conventionally known to those skilled in the art. Since the adjustment points are not inaccessible in every case, this step could be preceded, for example, by reporting of accessibility or inaccessibility of the adjustment points to the computer.

In STEP 530, the computer retrieves the baseline wheel alignment angle data from memory. Change in wheel alignment angle from the baseline wheel alignment angle is measured (STEP 540) while the mounting structure is adjusted. Finally, in STEP 550, the change in wheel alignment angle data and the required change in the wheel alignment angle are compared. For example, continuing the example, above, the required change to camber is −½° and the required change to caster is −1°. In other words, the camber requires a −½° differential change and the caster requires a −1° differential change. Thus, in STEP 540, the camber may initially be adjusted −¼° and the caster may initially be adjusted −½°. Then, in STEP 550, these differential changes, or changes in wheel alignment angle data, would be compared to the required change in the wheel alignment angle.

This process could be performed as an iterative process, wherein the output signal is sent to a display or other readout device to be interpreted by a technician and acted on, accordingly. Or, in a preferred embodiment, the computer produces an output signal, such as to a display or speaker, when the change in wheel alignment angle data is substantially equal to the required change in the wheel alignment angle. This would allow, for example, the technician to continue the adjustment until the change in wheel alignment angle measured by the measurement device attached to the mounting structure substantially corresponds to the required differential change(s), plus or minus an acceptable tolerance, as accepted in the industry or allowed by the OEM (original equipment manufacturer). Any conventional alignment head, including targets for 3D systems, may be used with the measurement device.

Further, although not shown in FIG. 5, the method of this embodiment includes reattaching the rim and wheel to the mounting structure and compensating for run out, as conventionally known and practiced in the industry. Likewise, the method of the present embodiment also includes remeasuring of the wheel alignment angle following compensation for run out.

Figure 6:
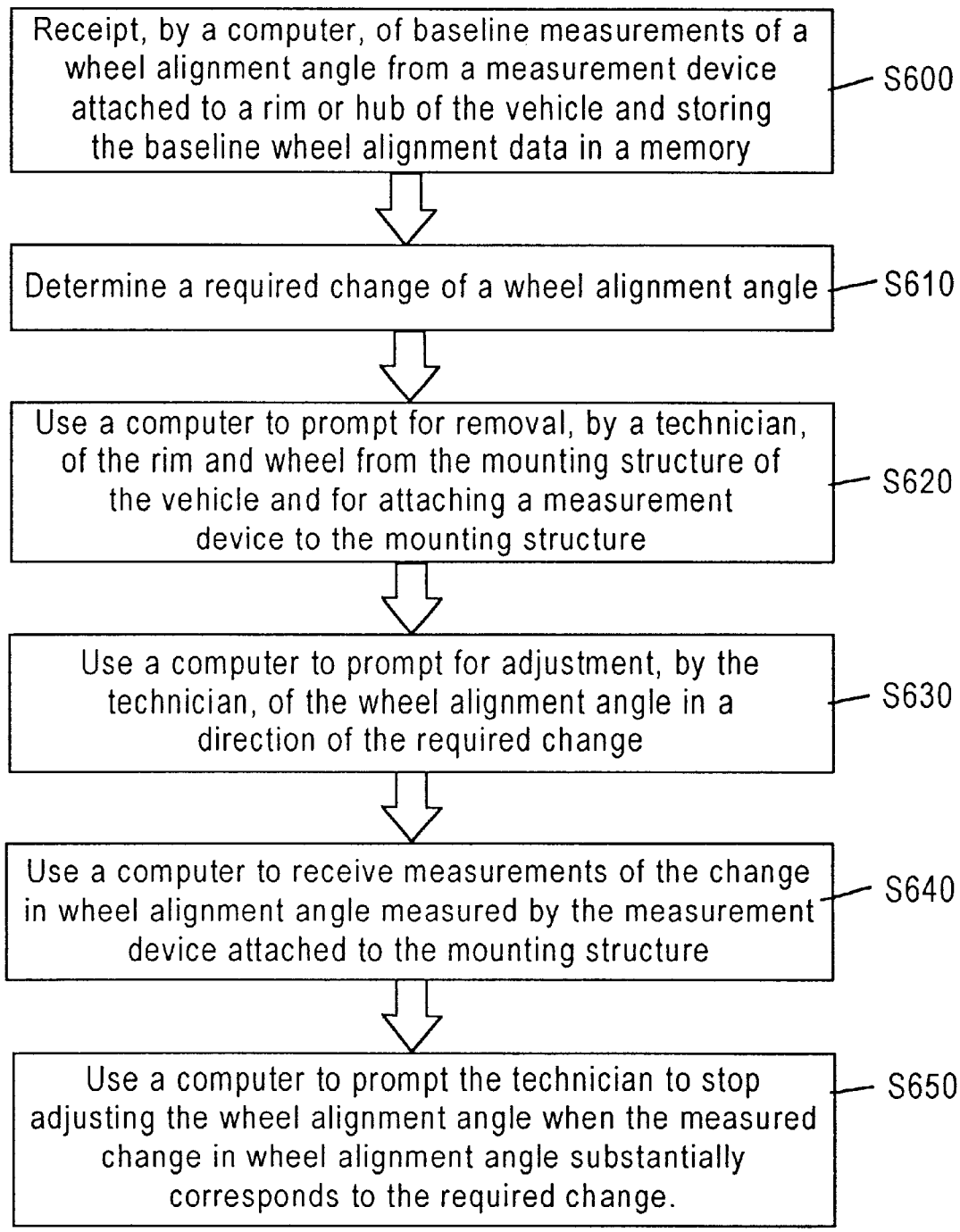
FIG. 6 is a flowchart showing the various steps of a second preferred embodiment of the present invention.

Referring to FIG. 6, another embodiment a computer-assisted method for adjusting alignment angles of a wheel mounted to a wheel mounting structure of a vehicle is shown. In STEP 600 a computer receives baseline measurements of a wheel alignment angle from a measurement device attached to a rim or hub of the vehicle and stores the baseline wheel alignment angle data in a memory. In a preferred embodiment, the computer is programmed to provide additional prompting, in the form of detailed instructions, to the technician. For example, the computer may prompt the technician to take affirmative actions to stabilize the readings, such as by locking the brakes and measuring heads and other conventional measures commonly taken to ensure accurate measurements, to allow the computer to appropriately set a base line for adjustment. After a required change a wheel alignment angle is determined in STEP 610, the computer prompts a technician to remove the rim and wheel from the mounting structure of the vehicle in STEP 620 to thereby expose the conventional adjustment points. In a preferred embodiment, STEP 620 may also include additional instructions, prompting the technician, for example, to raise the front or the rear of the vehicle, as appropriate, on fixed supports to enable removal of the rim assembly from the mounting structure. This preferred embodiment may also include an additional step of inputting into the computer by the technician data indicative of the accessibility or inaccessibility of the adjustment points. Further, in step 620, the computer prompts for attaching of a measurement device to the mounting structure, which in a preferred embodiment is the hub of the vehicle, as shown in FIG. 4.

The computer next prompts the technician to adjust the wheel alignment angle in a direction of the required change (STEP 630). Thus, for example, the computer could output to a display screen or speaker that the technician is to adjust the camber by −½° and the caster by −1°. As these adjustments are performed, the computer, in STEP 640, receives measurements of the change in wheel alignment angle measured by the measurement device attached to the mounting structure. Finally, the computer prompts the technician to stop adjusting the wheel alignment angle when the measured change in wheel alignment angle substantially corresponds to the required change (STEP 650). Thus, when the measured change in wheel alignment angle substantially corresponds to the required change, such as the −½° camber change and the −1° caster change referred to above, STEP 650 prompts the technician to stop the adjustment of the adjustment points. In a preferred embodiment of this method, this prompt to the technician would include an audio indication of sufficient intensity so as to be audible over background noise.

In the preferred embodiment, upon completion of the necessary adjustments, the processor prompts the technician to remove the measurement device, reinstall the wheel, reinstall the measurement device to, for example, the rim or hub, and perform run out compensation or wheel positioning, as known and practiced by those skilled in the art. At this point, the adjustment of the wheel alignment is complete.

In the previous descriptions, numerous specific details are set forth, such as specific materials, structures, processes, etc., in order to provide a thorough understanding of the present invention. However, as one having ordinary skill in the art would recognize, the present invention can be practiced without resorting to the details specifically set forth. In other instances, well known processing structures have not been described in detail in order not to unnecessarily obscure the present invention.

Only the preferred embodiment of the invention and an example of its versatility are shown and described in the present disclosure. It is to be understood that the invention is capable of use in various other combinations and environments and is capable of changes or modifications within the scope of the inventive concept as expressed herein. Moreover, although examples of the method of the present invention were discussed in relation to specific examples of its application to the adjustment of the caster and camber of an automobile wheel, the present invention is similarly applicable to other sources of wheel misalignment, which are not enumerated herein, but are understood by those skilled in the art.

What is claimed is:

1. A computer-assisted method for adjusting alignment angles of a wheel attached to a wheel mounting structure of a vehicle, comprising the steps of:
   (a) measuring a baseline wheel alignment angle with respect to a rim or hub of a wheel and using a computer for storing baseline wheel alignment angle data in a memory;
   (b) determining from the baseline wheel alignment angle a required change in the wheel alignment angle;
   (c) removing the wheel and rim from the wheel mounting structure;
   (d) using the computer, retrieving the baseline wheel alignment angle data from the memory;
   (e) measuring a change in wheel alignment angle from the baseline wheel alignment angle while adjusting the wheel mounting structure; and
   (f) comparing the change in wheel alignment angle data and the required change in the wheel alignment angle.

2. The method of claim 1, further comprising:
   (g) producing an output signal when the change in wheel alignment angle data is substantially equal to the required change in the wheel alignment angle.

3. The method of claim 1, further comprising:
   (h) reattaching the rim and wheel to the wheel mounting structure and compensating for run out.

4. The method of claim 1, further comprising:
   (i) remeasuring the wheel alignment angle following compensation for run out.

5. The method of claim 1, wherein the wheel mounting structure comprises one of a hub, a drum, a brake rotor, a spindle, and a bolt adapted to hold wheel bearings in place.

6. The method of claim 4, further comprising using the computer for generating an output signal to prompt a technician to perform at least one of steps (a)–(i).

7. The method of claim 6, wherein the output signal is at least one of an audio signal, a visual signal, and a print signal.

8. A computer-assisted method for adjusting alignment angles of a wheel mounted to a wheel mounting structure of a vehicle, comprising the steps of:
   (a) receiving by a computer baseline measurements of a wheel alignment angle from a measurement device attached to a rim or hub of the vehicle and storing the baseline wheel alignment angle data in a memory;
   (b) determining a required change a wheel alignment angle;
   (c) prompting for removal, by a technician, of the rim and wheel from the wheel mounting structure of the vehicle and for attaching a measurement device to the mounting structure;
   (d) prompting for adjustment, by the technician, of the wheel alignment angle in a direction of the required change;
   (e) receiving measurements of the change in wheel alignment angle measured by the measurement device attached to the wheel mounting structure; and
   (f) prompting the technician to stop adjusting the wheel alignment angle when the measured change in wheel alignment angle substantially corresponds to the required change.

9. The method of claim 8, further comprising:
   (g) using the computer, prompting the technician to reattach the rim and wheel to the wheel mounting structure; and
   (h) prompting the technician to perform run out compensation.

10. The method of claim 9, further comprising:
    (i) receiving by the computer measurement of the wheel alignment angle following compensation for run out.

11. The method of claim 8, further comprising:
    suspending receipt of measurement of wheel alignment angle data from the time at which the measurement device attached to the rim or hub is removed until the time at which the measurement device attached to the wheel mounting structure is installed.

12. The method of claim 8, further comprising:
    suspending receipt of measurement of wheel alignment angle data from the time at which the measurement device attached to the wheel mounting structure is removed until the time at which the measurement device to be attached to the rim or hub is reinstalled.

13. The method of claim 10, wherein the mounting structure comprises at least one of a hub, a drum, a brake rotor, a spindle, and a bolt adapted to hold wheel bearings in place.

14. The method of claim 10, wherein at least one of steps (a)–(i) further comprises generation of an output signal by the computer to prompt the technician.

15. The method of claim 14, wherein the output signal is at least one of an audio signal, a visual signal, and a print signal.

16. A computer-assisted wheel alignment system for adjusting alignment angles of a wheel attached to a wheel mounting structure of a vehicle, comprising:
    a processor;
    a memory storing reference wheel alignment data;
    a measuring device configured to be attached alternatively to (1) a rim or hub of a wheel to produce baseline wheel alignment angle data and (2) the wheel mounting structure to produce a change in wheel alignment angle data; and
    a data transmission path for carrying data between said measuring device and said processor,
    wherein said processor is programmed to produce an output signal indicating a degree of difference between said baseline wheel alignment angle data and a change in wheel alignment angle data measured by said measurement device.

17. The wheel alignment system of claim 16, further comprising a display connected to said processor, wherein said processor supplies a visual indication of said signal to said display.

18. The wheel alignment system of claim 16, further comprising a sound generating device configured to produce a sound corresponding to said signal supplied by said processor.

19. The wheel alignment system of claim 16, wherein said measuring device further comprises an alignment head and a clamping device detachably provided for clamping said alignment head to at least one of a hub, a rim, and the wheel mounting structure of a vehicle.

20. The wheel alignment system of claim 16, wherein said measuring device comprises a first measuring device configured to be attached to a rim or hub of a wheel and a second measuring device to be attached to the wheel mounting structure.

* * * * *